United States Patent
Kutch

(10) Patent No.: US 9,379,977 B2
(45) Date of Patent: Jun. 28, 2016

(54) TECHNIQUES FOR A SWITCH TO RECEIVE NETWORK CONTROLLER SIDEBAND INTERFACE CONTROL PACKETS

(71) Applicant: Patrick G. Kutch, Tigard, OR (US)

(72) Inventor: Patrick G. Kutch, Tigard, OR (US)

(73) Assignee: INTEL CORPORATION, Santa Clara, CA (US)

( * ) Notice: Subject to any disclaimer, the term of this patent is extended or adjusted under 35 U.S.C. 154(b) by 111 days.

(21) Appl. No.: 14/280,366

(22) Filed: May 16, 2014

(65) Prior Publication Data

US 2015/0334018 A1 Nov. 19, 2015

(51) Int. Cl.
*H04L 12/741* (2013.01)
*H04L 29/12* (2006.01)
*H04L 12/24* (2006.01)

(52) U.S. Cl.
CPC .......... *H04L 45/745* (2013.01); *H04L 41/0846* (2013.01); *H04L 61/2069* (2013.01)

(58) Field of Classification Search
CPC .............. H04L 45/745; H04L 41/0846; H04L 61/2069
See application file for complete search history.

(56) References Cited

U.S. PATENT DOCUMENTS

| | | | | |
|---|---|---|---|---|
| 2011/0040917 A1* | 2/2011 | Lambert | ................. | H04L 69/14 710/301 |
| 2012/0057572 A1* | 3/2012 | Evans | ................. | H04W 88/085 370/338 |
| 2013/0326039 A1* | 12/2013 | Shah | ........................ | H04L 41/04 709/223 |
| 2014/0090051 A1* | 3/2014 | Brundridge | ............. | G06F 21/14 726/17 |
| 2014/0165183 A1* | 6/2014 | Dharmadhikari | ... | H04L 63/0227 726/13 |
| 2014/0173093 A1* | 6/2014 | Rabeela | .............. | H04L 61/2038 709/224 |
| 2015/0205746 A1* | 7/2015 | Bailey | ................. | G06F 13/4027 710/315 |

* cited by examiner

*Primary Examiner* — Brian D Nguyen

(57) ABSTRACT

Examples may include receiving, at a switch, an Ethernet frame having an Ethernet header that may indicate the Ethernet frame includes a network controller sideband interface (NC-SI) control packet from a management controller at a compute node coupled to the switch. In some examples, a response to a command included in a received NC-SI control packet that was encapsulated in an Ethernet frame may be processed at the switch and sent to the management controller.

22 Claims, 8 Drawing Sheets

Storage Medium 700

Computer Executable Instructions for 600

*FIG. 7*

TECHNIQUES FOR A SWITCH TO RECEIVE NETWORK CONTROLLER SIDEBAND INTERFACE CONTROL PACKETS

TECHNICAL FIELD

Examples described herein are generally related to a switch coupled to one or more compute nodes separately having a management controller.

BACKGROUND

In some of today's server systems, one or more compute nodes coupled to a switch may separately have a management controller. The management controller may be referred to as a baseband management controller (BMC). The management controller may have its own media access control (MAC) address to allow the management controller to provide various types of network services. The types of network services may include usage of various types of remote management protocols such as those associated with the intelligent platform management interface (IPMI), the file transfer protocol (FTP), the hypertext transfer protocol (HTTP), the remote desktop protocol (RDP).

Typically, a management controller may couple to a local access network (LAN) on motherboard (LOM) in order to gain network connectivity. For example, the management controller may be able to send and receive network traffic such as Ethernet traffic by sharing a physical port of the LOM with a host OS using a sideband technology such as one described by the Distributed Management Task Force (DMTF) in the Network Controller Sideband Interface (NC-SI) Specification, version 1.0, published in July 2009 and/or later versions of revisions. Ethernet traffic (e.g., Ethernet frames) may be arranged according to communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3")

BRIEF DESCRIPTION OF THE DRAWINGS

FIG. 7 illustrates an example of a storage medium.

DETAILED DESCRIPTION

Figure 1:
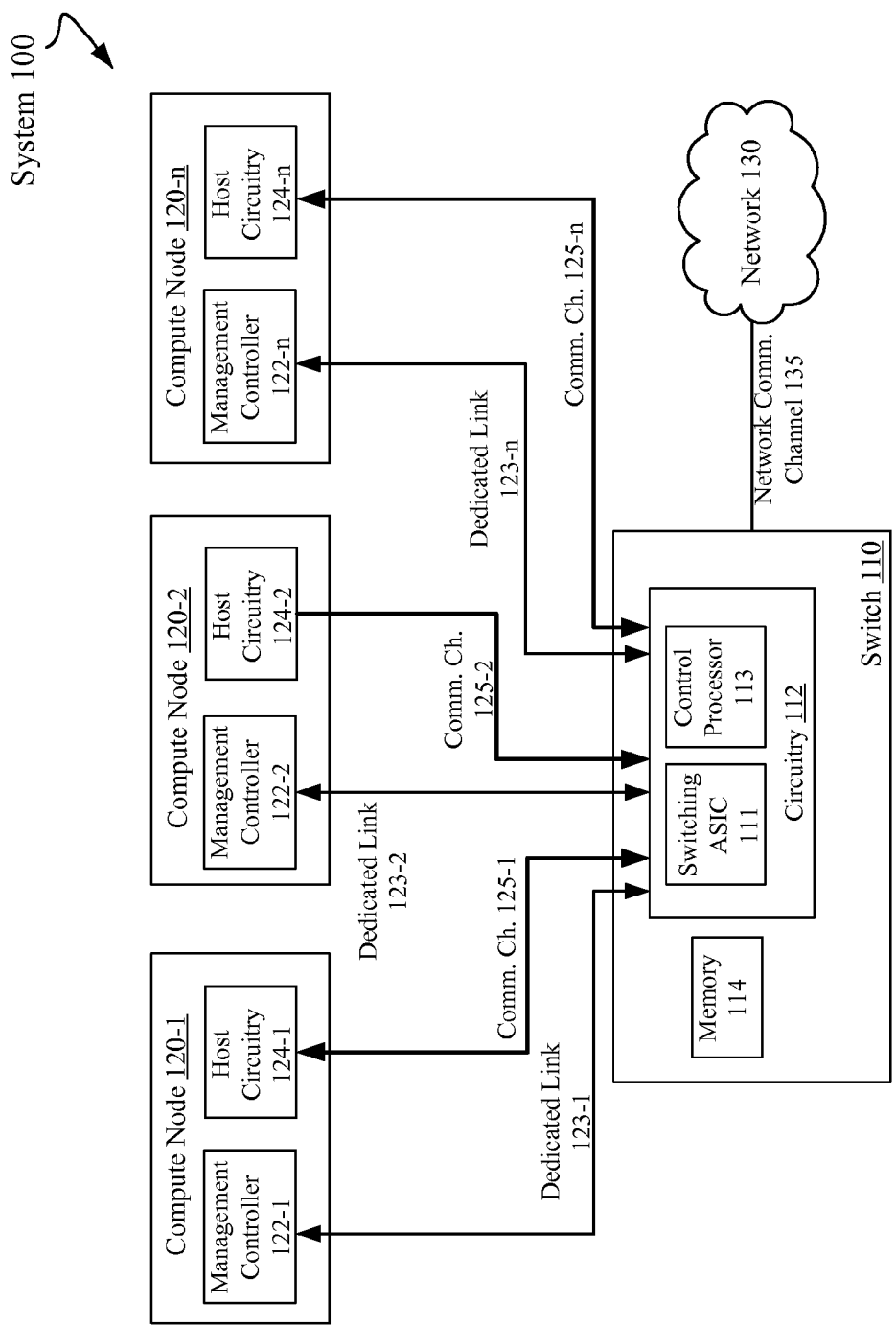
FIG. 1 illustrates an example system.

As contemplated in the present disclosure, a management controller for a compute node may have its own MAC address to provide network services. If a management controller is resident on a compute node having an LOM, the management controller may use a shared port with a host OS to obtain the MAC address from an Ethernet controller via a sideband link. The sideband link, for example, may be arranged according to the NC-SI specification and the management controllers may use commands defined by the NC-SI specification to obtain the MAC address. In this way, an original equipment manufacturer (OEM) may not have to program MAC addresses for the host OS and the management controller in separate locations. For example, a first non-volatile memory (NVM) to store the host OS MAC address and a second NVM to store the management control MAC address. Instead, an OEM may just have to program MAC addresses in a single NVM for the Ethernet controller.

In some examples, a new type of hybrid switch is being deployed that supports a plurality of Ethernet links though separate peripheral component interconnect express (PCIe) links (e.g., via some kind of fabric or communication channel) with host circuitry (which implements the host OS) at a respective compute node. The PCIe links may be arranged to operate in compliance with one or more industry standards or specifications (including progenies or variants) to include the Peripheral Component Interconnect (PCI) Express Base Specification, revision 3.0, published in November 2010, and/or later versions or revisions. The new type of hybrid switch may have a of network interface card (NIC) interfaces or network input/output (I/O) devices to support a multitude of Ethernet links with one or more compute nodes. The multitude of network I/O devices may allow the one or more compute nodes to separately receive or send Ethernet frames over the multitude of Ethernet links.

In some examples, when a given compute node queries for PCIe devices, the new type of hybrid switch may appear as an Ethernet Controller. The given compute node may then be able to receive or send Ethernet frames without having to have any sort of actual Ethernet controller or LOM resident at the given compute node. For these examples, if the given compute node has no resident Ethernet controller or LOM, there may be no sideband connection for a management controller at the given compute node to use to obtain a MAC address via NC-SI protocols. As a result, an OEM for the given compute node may be forced to program a MAC address within a local NVM of the management controller. The programming of MAC addresses for each management controller may be an unacceptable and/or time consuming burden to the OEM. Also, other NC-SI commands (e.g., setting unicast or multicast MAC address filters) may not be available to management controllers on compute nodes lacking a resident Ethernet controller and associated sideband link. It is with respect to these benefits and/or other challenges that the examples described herein are needed.

According to some examples, techniques for a switch to receive NC-SI control packets may include receiving an Ethernet frame from a port of the switch coupled to a management controller resident on a compute node from among one or more compute nodes coupled to the switch. The techniques may also include determining whether the Ethernet frame has an Ethernet header that indicates the Ethernet frame includes a network controller sideband interface (NC-SI) control packet and then forwarding the Ethernet frame to a control processor for the switch that is capable of responding to a command included in the NC-SI control packet based on the determination. For these examples, a response may include, but is not limited to, a MAC address for use by the management controller to receive or send Ethernet frames through one or more network I/O devices maintained at the switch.

FIG. 1 illustrates an example system 100. In some examples, as shown in FIG. 1, system 100 includes a switch 110 coupled to compute nodes 120-1 to 120-*n*, where "n" is any positive whole integer greater than 2. For these examples, FIG. 1 also shows switch 110 as including circuitry 112 and memory 114 (e.g., non-volatile memory). FIG. 1 also shows compute nodes 120-1, 120-2 and 120-*n* including respective management controllers 120-1, 120-2, 120-*n* and respective host circuitry 124-1, 124-2, 124-*n*. Also for these examples, FIG. 1 shows that management controllers 120-1, 120-2, and 120-*n* may couple to circuitry 112 at switch 110 via respective dedicated links 123-1, 123-2 and 123-*n*. Further, FIG. 2 also shows that respective host circuitry 124-1, 124-2 and 124-*n* couple to circuitry 112 via respective communication channels 125-1, 125-2 and 125-*n*. According to some examples, both dedicated links 123-1 to 123-*n* and communication channels 125-1 to 125-*n* may be arranged to operate in compliance with IEEE 802.3 in order to receive or send Ethernet frames.

According to some examples, switch 110 may be coupled to a network 130 via network communication channel 135. Network communication channel 135 may also be arranged to operate in compliance with IEEE 802.3

In some examples, circuitry 112 of switch 110 may support one or more network I/O devices or NICs via which management controllers and/or host circuitry at a given compute node may receive/send Ethernet frames originating from or destined to network 130. In some examples, communication channels 125-1 to 125-*n* may be arranged to enable host circuitry 124-1 to 125-*n* to connect or couple with switch 110 over a PCIe link and then receive/send Ethernet frames over communication channels 125-1 to 125-*n* without the need for a resident Ethernet controller at compute nodes 120-1 to 120-*n*. As such, switch 110 may be configured as a type of hybrid switch.

According to some examples, a communication channel from among communication channels 125-1 to 125-*n* may couple to a port at the one or more network I/O interfaces supported by circuitry 112. For these examples, control processor 113 may be capable of controlling or configuring switch ASIC 111 to route Ethernet frames to/from compute nodes 120-1 to 120-*n* through these supported network I/O interfaces and over a respective communication channel. These routed Ethernet frames may be between compute nodes or may be between a compute node and a destination/source associated with network 130.

In some examples, a dedicated link from among dedicated links 123-1 to 123-*n* may couple to another port at the one or more network I/O interfaces supported by circuitry 112. As described more below, in some examples, logic and/or features of ASIC 111 may be arranged to receive Ethernet frames from management controllers coupled to the dedicated link and determine whether the Ethernet frame has an Ethernet header that indicates the received Ethernet frame includes an NC-SI control packet (e.g., via use of a filter component or logic). If the Ethernet frame is determined to have the NC-SI control packet, the logic and/or features of ASIC 111 may be arranged to forward the Ethernet frame to logic and/or features of control processor 113 to respond to a command included in the NC-SI control packet. According to some examples, the command may include a request for a MAC address and the logic and/or features of control processor 113 may obtain a MAC address from memory 114 and send the MAC address to the management controller in a response included in another NC-SI control packet encapsulated within a separate Ethernet frame.

According to some examples, communication channels 125-1 to 125-*n* may include high throughput or bandwidth communication channels (e.g., multiple gigabits (Gbits) per second) configured as a type of switch fabric to route Ethernet frames to/from respective host circuitry 124-1 to 124-*n* at compute nodes 120-1 to 120*n*.

In some examples, dedicated links 123-1 to 123-*n* may include lower throughput or bandwidth communication links as compared to communication channels 125-1 to 125-*n* (e.g., 100 megabits (Mbits) per second or less). For these examples, dedicated links 123-1 to 123-*n* may be arranged to route Ethernet frames to/from respective management controllers 122-1 to 122-N at compute nodes 120-1 to 120-*n* through a serial/deserializer (SerDes) interface or other type of interface for a lower throughput or bandwidth communication link. Also, in some examples, dedicated links 123-1 to 123-*n*, as shown in FIG. 1, are separate from or not accessible to respective host circuitry 124-1 to 124-*n* and thus are dedicated for use by respective management controller 122-1 to 122-*n* to receive/send Ethernet frames that may or may not include or encapsulate NC-SI control packets. These dedicated links may also be referred to as out-of-band or sideband communication links that are not routed through host circuitry of a compute node.

Figure 2:
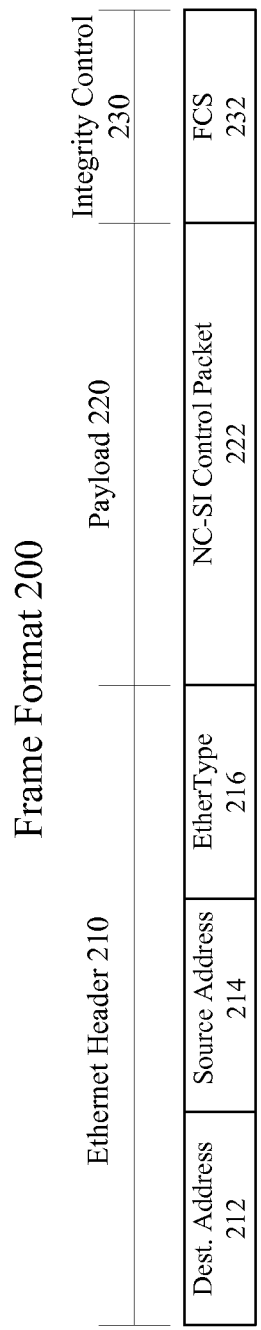
FIG. 2 illustrates an example frame format.

FIG. 2 illustrates an example frame format 200. In some examples, as shown in FIG. 2, frame format 200 may include an Ethernet header 210, a payload 220 and integrity control 230. Also, as shown in FIG. 2, Ethernet header 210 includes fields for destination address 212, source address 214 and EtherType 216. According to some examples, as shown in FIG. 2, payload 220 may include a field for an NC-SI control packet 222 and integrity control 230 may include a field for a frame check sequence (FCS) 232.

According to some examples, Ethernet frames in example frame format 200 may be exchanged between a switch and one or more compute nodes having respective management controllers over a dedicated links. For example, frame format 200 may be used by logic and/or features of switch 110 and management controllers for compute nodes 120-1 to 120-*n* shown in FIG. 1. For these examples, the logic and/or features of switch 110 such as ASIC 111 may be capable of receiving an Ethernet frame from a management controller such as management controller 122-1 in the example format of frame format 200 over dedicated link 123-1 to handle and process NC-SI control packets possibly encapsulated in the received Ethernet frame.

In some examples, destination address 212 and/or source address 214 included in Ethernet header 210 may each have either a destination/source MAC address or a broadcast address such as FF:FF:FF:FF:FF:FF. The broadcast address may be used if an Ethernet frame in the example format of frame format 200 encapsulates an NC-SI control packet as indicated in EtherType 216. For these examples, encapsulation of an NC-SI control packet may be indicated by a fixed hexadecimal value of 0x88F8 in EtherType 216. Examples are not limited to only a fixed hexadecimal value of 0x88F8, other fixed values are contemplated.

According to some examples, if the Ethernet frame encapsulates an NC-SI control packet the Ethernet frame in the example format of frame format 200 may be included in NC-SI-control packet 222. Also, integrity control for the Ethernet frame may be included in FCS 232 to facilitate packet integrity of a received or sent Ethernet frame in the example format of frame format 200.

According to some examples, logic and/or features of switch 110 may use the value included in EtherType 216 to determine whether a received Ethernet frame includes an encapsulated NC-SI control packet. The logic and/or features of switch 110 may route the packet according to the indicated destination address in destination address 212 if the value does not match the fixed hexadecimal value of 0x88F8. If the value does match, the logic and/or features of switch 110 may forward the Ethernet frame for further processing to respond to the command or request included in the NC-SI control packet (e.g., a request for a MAC address). As described more below, an NC-SI header included with the encapsulated NC-SI control packet may be used to process the command or request.

In some examples, logic and/or features of switch 110 may generate an Ethernet frame in the example frame format 200 to send a response to a processed command or request. For these examples, the fixed hexadecimal value of 0x88F8 may be included in EtherType 216 and information associated with the response (e.g., provide a MAC address) may be included in NC-SI control packet 222. The broadcast destination/source address of FF:FF:FF:FF:FF:FF may be used as well in destination/source 212/214. Integrity control for the Ethernet frame may be included in FCS 232 to facilitate packet integrity of the Ethernet frame.

Figure 3:
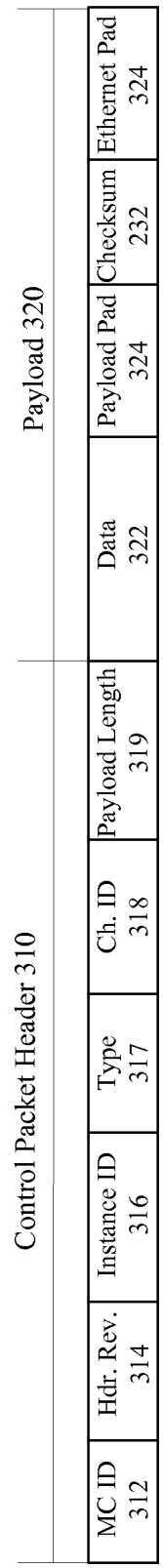
FIG. 3 illustrates an example control packet format

FIG. 3 illustrates an example control packet format 300. As shown in FIG. 3, control packet format 300 may include a control packet header 310 and a payload 320. According to some examples, control packet format 300 may be for an NC-SI control packet encapsulated within or included in an Ethernet frame in the format of example frame format 200 as shown in FIG. 2. Included in control packet header 310, as shown in FIG. 3, are fields for management controller identifier (MC ID) 312, header revision 314, instance ID 316, type 317, channel (Ch.) ID 318 or payload length 316. Included in payload 320, as shown in FIG. 3, are fields for data 322, payload pad 324, checksum 232 or Ethernet pad 324.

According to some examples, MC ID 312 may be a field set by a management controller that originated a command. For these examples, logic and/or features of a switch receiving a control packet having the command may copy the MC ID 312 in a control packet included in a response to the command. Also, in some examples, the logic and/or features of the switch may recognize the port of the switch coupled to the management controller as belonging to a specific management controller. For these examples, the MC ID in MC ID 312 may be set to a fixed value (e.g., a value of "1" or "0") since the specific management controller may be recognized by the port via which the control packet was received (e.g., via a dedicated link).

In some examples, header revision 314 may be a field that identifies a version of control packet in use by the sender. Also, instance ID field 316 may be a field that includes an instance ID of a command and an associated response to the command. Logic and/or features at a switch that may process a command may use information in ID field 316 to differentiate old commands from new commands.

According to some examples, type 317 may be a field that includes an identifier used to identify commands and responses. In some examples, NC-SI compliant commands and associated responses may be assigned unique values as identified in the NC-SI specification. For example, a type of command to set a MAC address to set-up one or more unicast or multicast MAC address filters at a switch in order to selectively forward inbound Ethernet frames to a management controller that sent the command. This example of a set a MAC address command may be assigned a hexadecimal value of 0x0E and an associated response may have a value of 0x8E as defined in the NC-SI specification. In another example, a type of command to get parameters may be used to get configuration parameter values that may have been put into effect by the management controller that sent one or more previously received commands. This example of a get parameter command may have a hexadecimal value of 0x17 and an associated response may have a value of 0x97 as defined in the NC-SI specification.

In some examples, an identifier assigned by the NC-SI specification and included in type 317 may be for an OEM command/response. This example of an OEM command may have a hexadecimal value of 0x50 and an associated response may have a value of 0xD0. For these examples, an OEM may have some flexibility to enable a management controller to request vendor-specific information or data. For example, the vendor-specific information may be MAC addresses programmed by the OEM to an NVM that may be accessible to logic and/or features of a switch. The MAC addresses may be for a plurality of management controllers expected to be coupled to the switch when deployed (e.g., in a rack, tray or self). As mentioned previously, management controllers may need their own MAC addresses in order to separately receive or send Ethernet frames through one or more network I/O devices maintained at the switch. Vendor-specific information is not limited to MAC addresses for management controllers. Other types of vendor-specific information are contemplated by this disclosure.

According to some examples, Ch. ID 318 may be a field that includes a channel identifier. For these examples, according to the NC-SI, a management controller may set the value included in Ch. ID 318 in order to specify a package and internal channel ID for which a given command is intended.

In some examples, payload length 319 may be a field that indicates a size or length (e.g., in bytes) of payload data present in a command or response following the control packet header 310.

According to some examples, data 322 may be a field including the payload data for an NC-SI control packet in the example format of control packet format 300. For these examples, payload data may be variable sizes and may require alignment or padding. Payload pad 324, for example, may be a field used to pad a payload if data included in data 322 does not end on a 32-bit boundary. For this example, padding bytes may be used to cause checksum 232 to be aligned to a 32-bit boundary. Checksum 232 may then be used to verify packet integrity of the NC-SI control packet.

In some examples, Ethernet pad 324 may be a field used to ensure a length of an Ethernet frame that encapsulates or includes an NC-SI control packet in the example format of control packet format 300 is at least 64 bytes. For these examples, padding may be needed to bring the Ethernet frame into compliance with IEEE 802.3.

Figure 4:
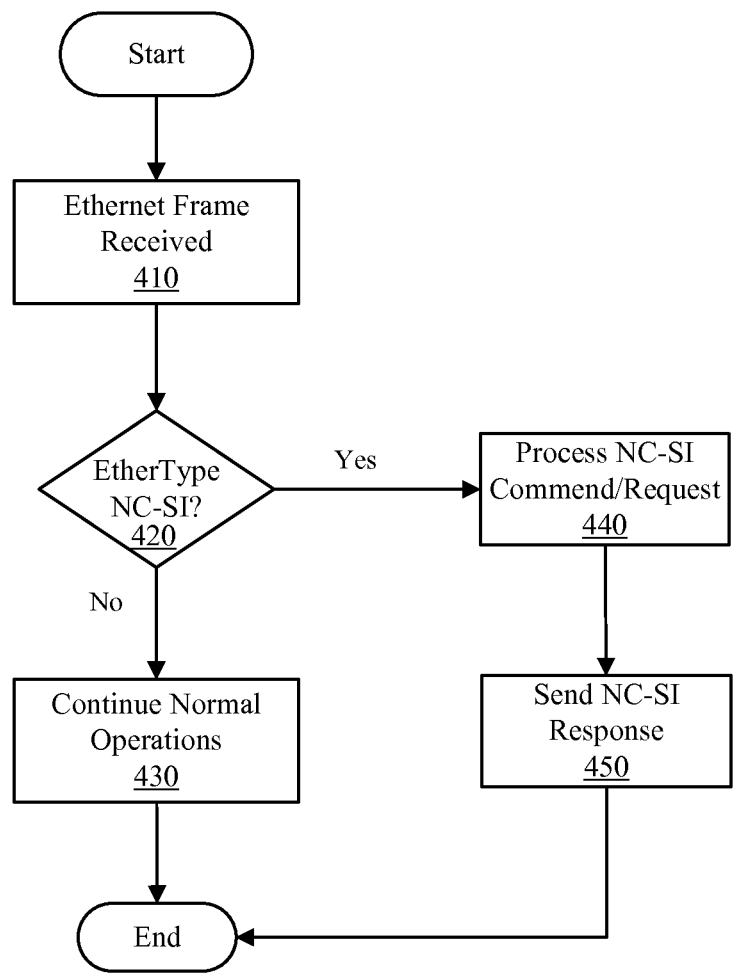
FIG. 4 illustrates an example flow diagram.

FIG. 4 illustrates an example flow diagram. As shown in FIG. 4, the flow diagram includes flow 400. In some examples, elements of system 100 as shown in FIG. 1 as well as frame format 200 and control packet format 300 as described in FIGS. 2 and 3 may be used to illustrate example operations related to flow 400. The described example operations are not limited to implementations on system 100 or the frame/control packet formats described therein for FIGS. 1-3.

Moving from the start to block 410 (Ethernet Frame Received), logic or features at a switch 110 such as switch ASIC 111 may receive an Ethernet frame from a port of switch 110 coupled to management controller such as management controller 122-1 resident on compute node 120-1. For these examples, the received Ethernet frame may be in the example format of frame format 200.

Proceeding from block 410 to decision block 420 (EtherType NC-SI?), the logic or features at ASIC 111 may be capable of determining whether EtherType 216 has a value that indicates whether the received Ethernet frame includes an NC-SI control packet. As mentioned above for FIG. 2, a hexadecimal value of 0x88F8 in EtherType 216 may indicate that the Ethernet frame includes an NC-SI control packet. Therefore, if EtherType 216 has a value of 0X88F8, the process moves to block 450. Otherwise, the process moves to block 430.

Moving from decision block 420 to block 430 (Continue Normal Operations), the logic or features at the switch may continue with normal operations that may include forwarding the received Ethernet frame to its destination address as indicated in the received Ethernet frame. Normal operations may also include processing the frame for non NC-SI responses if the destination address is the switch's address. The process then may then come to an end.

Moving from decision block 420 to block 440 (Process NC-SI Command/Request), the logic or features at ASIC 111 may cause the received Ethernet frame to be forwarded to logic and/or features of control processor 113 to process a command/request included in the NC-SI control packet. In some examples, the NC-SI control packet may be in the example format of control packet format 300 and may indicate a command type in type 317. For these examples, the logic and/or features of control processor 113 may be capable of responding to the command/request based on the command type indicated in type 317. For example, the command may include a request for a MAC address for management controller 122-1 to receive or send Ethernet frames through a network I/O device maintained at switch 110.

Proceeding from block 440 to block 450 (Send NC-SI Response), the logic or features at control processor 113 may send an NC-SI response in an Ethernet frame in the example format of frame format 200 that includes an NC-SI control packet in the example format of control packet format 300. In some examples, the response may include providing a MAC address to management controller 122-1. The process may then come to an end.

Figure 5:
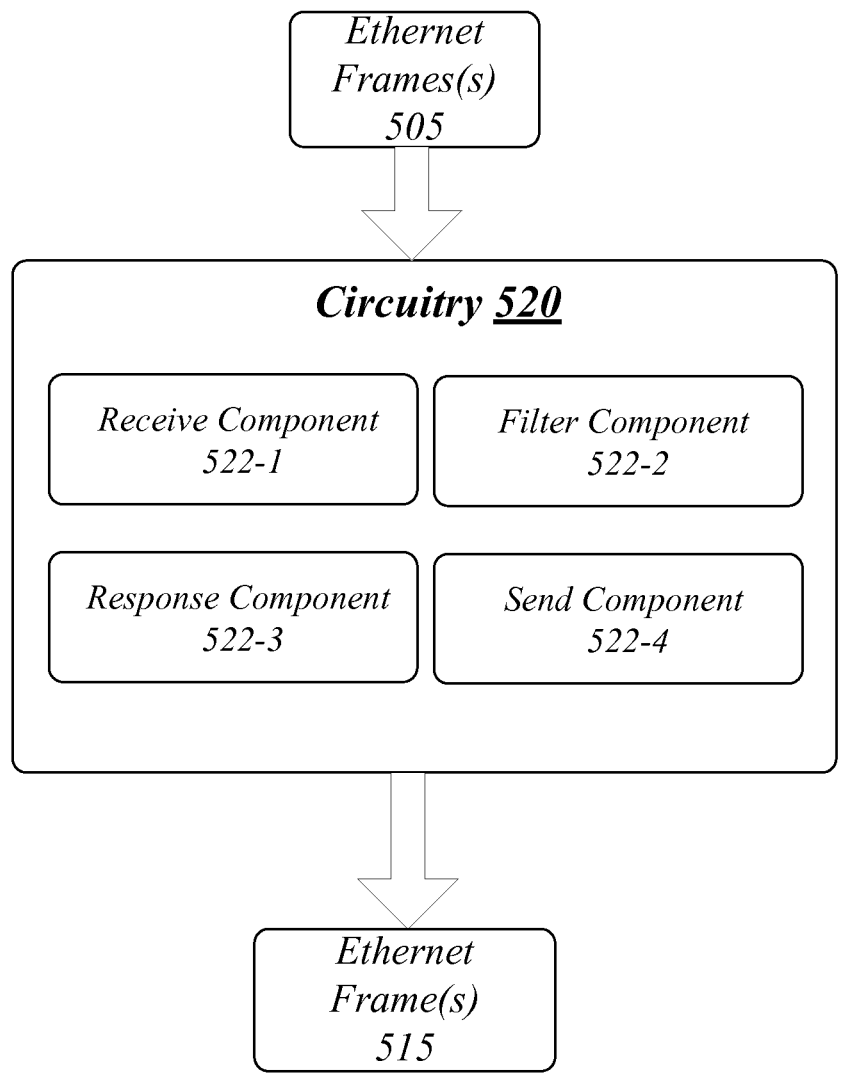
FIG. 5 illustrates an example block diagram for an apparatus.

FIG. 5 illustrates an example block diagram for a first apparatus 500. As shown in FIG. 5, the first apparatus includes an apparatus 500. Although apparatus 500 shown in FIG. 5 has a limited number of elements in a certain topology, it may be appreciated that the apparatus 500 may include more or less elements in alternate topologies as desired for a given implementation.

The apparatus 500 may be supported by circuitry 520 maintained at a switch computing device. Circuitry 520 may be arranged to execute one or more software or firmware implemented modules or components 522-a. It is worthy to note that "a" and "b" and "c" and similar designators as used herein are intended to be variables representing any positive integer. Thus, for example, if an implementation sets a value for a=5, then a complete set of software or firmware for components 522-a may include components 522-1, 522-2, 522-3 or 522-4. The examples presented are not limited in this context and the different variables used throughout may represent the same or different integer values.

According to some examples, circuitry 520 may include a processor or processor circuitry. Circuitry 520 may be part of circuitry at a switch (e.g., switching ASIC 111 or control processor 113 of switch 110) that includes processing cores. The circuitry including one or more processing cores can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 520 may also include an application specific integrated circuit (ASIC) and at least some components 522-a may be implemented as hardware elements of the ASIC.

According to some examples, apparatus 500 may include a receive component 522-1. Receive component 522-1 may be executed by circuitry 520 to receive Ethernet frame(s) 505 from a port of a switch that may include apparatus 500. The port may be coupled to a management controller resident on a compute node from among one or more compute nodes also coupled to the switch.

According to some examples, apparatus 500 may also include a filter component 522-2. Filter component 522-2 may be executed by circuitry 520 to determine whether a given Ethernet frame received with Ethernet frame(s) 505 indicates the Ethernet frame includes an NC-SI control packet. For these examples, the given Ethernet frame may be in the example format of frame format 200. Filter component 522-2 may be able to compare the value in EtherType 216 to a value of 0x88F8 to determine if the given Ethernet frame includes an NC-SI control packet. Filter component 522-2 may then forward the Ethernet frame or at least the NC-SI control packet to other components of apparatus 500 for further processing.

In some examples, apparatus 500 may also include a response component 522-3. Response component 522-3 may be executed by circuitry 520 to respond to a command included in the NC-SI control packet based on the determination by filter component 522-2 that the given Ethernet frame received with Ethernet frames(s) does indicate inclusion of the NC-SI control packet. For these examples, a response may include providing a MAC address, getting operating parameters or setting MAC address filters to name a few of the possible responses associated with received command/requests.

In some examples, apparatus 500 may also include a send component 522-4. Send component 522-4 may be executed by circuitry 520 to send a response to the command in Ethernet frame(s) 515. For these examples, the management controller may be coupled to the switch port via a dedicated Ethernet link (e.g., through a SerDes interface). Ethernet frame(s) 515 may be in the example format of frame format 200 and may be sent to the management controller over the dedicated Ethernet link. EtherType 216 may include the value of 0x88F8 to indicate to the management controller that Ethernet frame(s) 515 include an NC-SI control packet. Also, the NC-SI control packet may be in the example format of control packet format 300. Information included in the various fields of the NC-SI control packet may include a response to the NC-SI control packet received by received component 522-1 with Ethernet frames(s) 505 (e.g., a MAC address requested by the management controller).

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
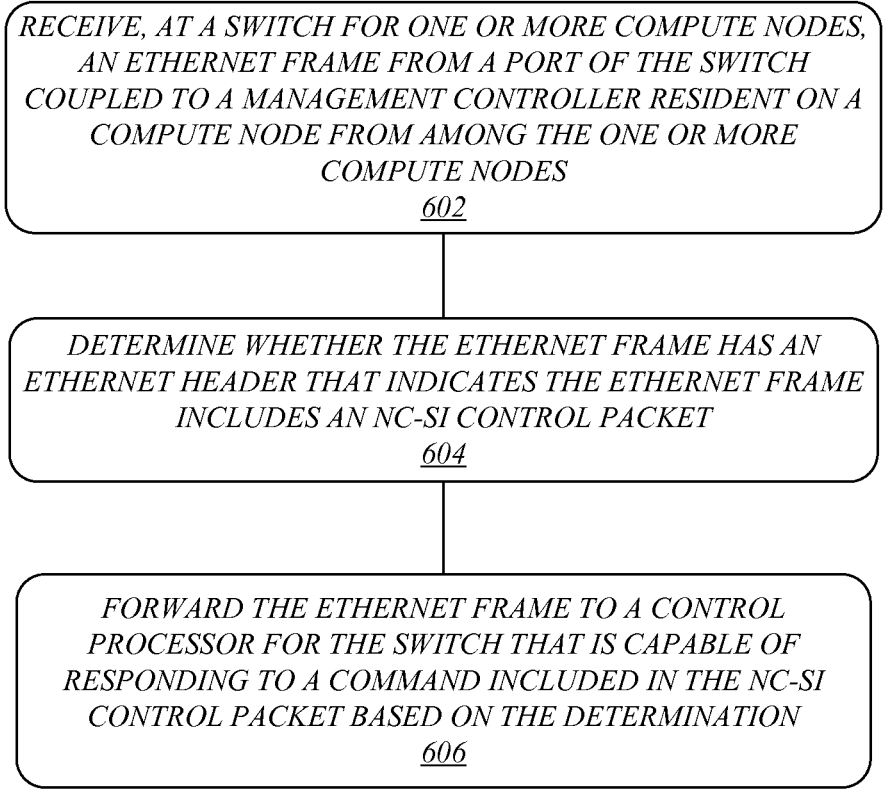
FIG. 6 illustrates an example of a logic flow.

FIG. 6 illustrates an example of a first logic flow. As shown in FIG. 6 the first logic flow includes a logic flow 600. Logic flow 600 may be representative of some or all of the operations executed by one or more logic, features, or devices described herein, such as apparatus 500. More particularly, logic flow 600 may be implemented by at least receive component 522-1, filter component 522-2, response component 522-3 or send component 522-4.

According to some examples, logic flow 600 at block 602 may receive, at a switch for one or more compute nodes, an Ethernet frame from a port of the switch coupled to a management controller resident on a compute node from among the one or more compute nodes. For these examples, receive component 522-1 may receive the Ethernet frame.

In some examples, logic flow 600 at block 604 may determine whether the Ethernet frame has an Ethernet header that indicates the Ethernet frame includes an NC-SI control packet. For these examples, filter component 522-1 may make this determination based on a value included in an EtherType field of the Ethernet header.

In some examples, logic flow 600 at block 606 may forward the Ethernet frame to a control processor for the switch that is capable of responding to a command included in the NC-SI control packet based on the determination. For these examples, filter component 522-2 may be capable of forwarding the Ethernet frame to response component 522-3. Response component 522-3 may then respond to the command and Send component 522-4 may cause the response to be sent to the management controller in another Ethernet frame.

FIG. 7 illustrates an example of a first storage medium. As shown in FIG. 7, the first storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
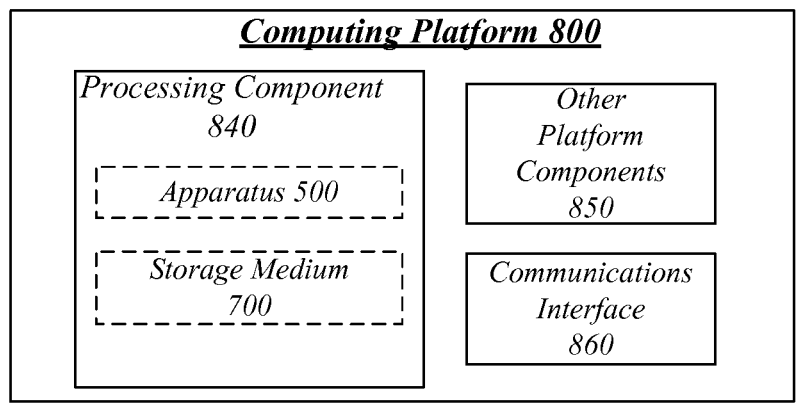
FIG. 8 illustrates an example computing platform.

FIG. 8 illustrates an example computing platform 800. In some examples, as shown in FIG. 8, computing platform 800 may include a processing component 840, other platform components or a communications interface 860. According to some examples, computing platform 800 may be implemented in a switch computing device capable of coupling to one or more compute nodes (e.g., in a rack, tray or shelf).

According to some examples, processing component 840 may execute processing operations or logic for apparatus 500 and/or storage medium 700. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 800 may be part of a switch computing device. Accordingly, functions and/or specific configurations of computing platform 800 described herein, may be included or omitted in various embodiments of computing platform 800, as suitably desired for a switch computing device.

The components and features of computing platform 800 may be implemented using any combination of discrete circuitry, application specific integrated circuits (ASICs), logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The follow examples pertain to additional examples of technologies disclosed herein.

Example 1

An example apparatus may include circuitry at a switch for one or more compute nodes. The example apparatus may also include a receive component for execution by the circuitry to receive an Ethernet frame from a port of the switch coupled to a management controller resident on a compute node from among the one or more compute nodes. The example apparatus may also include a filter component for execution by the circuitry to determine whether the Ethernet frame has an Ethernet header that indicates the Ethernet frame includes an NC-SI control packet. The example apparatus may also include a response component for execution by the circuitry to respond to a command included in the NC-SI control packet based the determination by the filter component.

Example 2

The example apparatus of example 1, the port of the switch may be coupled to a dedicated Ethernet link to the management controller.

Example 3

The example apparatus of example 2, the dedicated Ethernet link may be arranged to route Ethernet frames through a SerDes interface.

Example 4

The example apparatus of example 2 may also include a send component for execution by the circuitry to send a response to the command in another Ethernet frame via the dedicated Ethernet link. For example 4, the other Ethernet frame may have another Ethernet header that indicates an NC-SI control packet that includes the response.

Example 5

The example apparatus of example 4, the command may include a request for a MAC address for the management controller to receive or send Ethernet frames through a network I/O device maintained at the switch.

Example 6

The example apparatus of example 5 may also include a memory (e.g., non-volatile memory). For example 6, the response component may be capable of obtaining the MAC address for the management controller from the memory in order to respond to the command for the MAC address.

Example 7

The example apparatus of example 6, the command may include an OEM command that includes vender-specific information to obtain the MAC address from among a plurality of MAC addresses maintained in the memory for use by the one or more compute nodes to separately receive or send Ethernet frames through one or more network I/O devices maintained at the switch.

Example 8

The example apparatus of example 1, the filter component may determine that the Ethernet header indicates the Ethernet frame includes the NC-SI control packet based on an EtherType field in the Ethernet header that has a hexadecimal value of 0x88F8.

Example 9

An example method may include receiving, at a switch for one or more compute nodes, an Ethernet frame from a port of the switch coupled to a management controller resident on a compute node from among the one or more compute nodes. The example methods may also include determining whether the Ethernet frame has an Ethernet header that indicates the Ethernet frame includes a network controller sideband interface (NC-SI) control packet and forwarding the Ethernet frame to a control processor for the switch that is capable of responding to a command included in the NC-SI control packet based on the determination.

Example 10

The example method of example 9, the port of the switch may be coupled to a dedicated Ethernet link to the management controller.

Example 11

The example method of example 10, the dedicated Ethernet link may be arranged to route Ethernet frames through a SerDes interface.

Example 12

The example method of example 10 may also include sending a response to the command in another Ethernet frame via the dedicated Ethernet link. For example 12, the other Ethernet frame may have another Ethernet header that indicates an NC-SI control packet that includes the response.

Example 13

The example method of example 12, command may include a request for a MAC address for the management controller to receive or send Ethernet frames through a network I/O device maintained at the switch.

Example 14

The example method of example 13 may also include obtaining the MAC address for the management controller from a memory (e.g., non-volatile memory) maintained at the switch in order to respond to the command for the MAC address.

Example 15

The example method of example 14, the command may include an OEM command that includes vendor-specific information to obtain the MAC address from among a plurality of MAC addresses maintained in the memory for use by separate management controllers at the one or more compute nodes to separately receive or send Ethernet frames through one or more network I/O devices maintained at the switch.

Example 16

The example method of example 9, the Ethernet header may indicate that the Ethernet frame includes the NC-SI control packet based on an EtherType field in the Ethernet header that has a hexadecimal value of 0x88F8.

Example 17

An example machine readable medium including a plurality of instructions that in response to being executed on a computing device such as a switch may cause the switch to carry out a computer-implemented method according to any one of examples 9 to 16 for the example method.

Example 18

An example apparatus may include means for performing any one of examples 9 to 16 for the example method.

Example 19

The example at least one machine readable medium of example 19 may include a plurality of instructions that in response to being executed on a system at a switch for one or more compute nodes may cause the system to receive an Ethernet frame from a port of the switch coupled to a management controller resident on a compute node from among the one or more compute nodes. The instructions may also cause the system to determine whether the Ethernet frame has an Ethernet header that indicates the Ethernet frame includes an NC-SI control packet and forward the Ethernet frame to a control processor for the switch that is capable of responding to a command included in the NC-SI control packet based on the determination.

Example 20

The at least one machine readable medium of example 19, the port of the switch may be coupled to a dedicated Ethernet link to the management controller.

Example 21

The at least one machine readable medium of example 20, the dedicated Ethernet link may be arranged to route Ethernet frames through a SerDes interface.

Example 22

The at least one machine readable medium of example 19, the instructions may also cause the system to send a response to the command in another Ethernet frame via the dedicated Ethernet link. For example 22, the other Ethernet frame may have another Ethernet header that indicates an NC-SI control packet that includes the response.

Example 23

The at least one machine readable medium of example 22, the command may include a request for a MAC address for the management controller to receive or send Ethernet frames through a network I/O device maintained at the switch.

Example 24

The at least one machine readable medium of example 23, the command may include an OEM command that includes vendor-specific information to obtain the MAC address from among a plurality of MAC addresses maintained in a memory (e.g., non-volatile memory) for use by separate management controllers at the one or more compute nodes to separately receive or send Ethernet frames through one or more network I/O devices maintained at the switch.

Example 25

The at least one machine readable medium of example 19, the Ethernet header may indicate that the Ethernet frame includes the NC-SI control packet based on an EtherType field in the Ethernet header having a hexadecimal value of 0x88F8.

Example 26

The at least one machine readable medium of example 19, the command may include a request to set a MAC address to set-up one or more unicast or multicast MAC address filters at the switch in order to selectively forward inbound Ethernet frames to the management controller.

Example 27

The at least one machine readable medium of example 19, the command may include a request for a copy of currently stored parameter settings at the switch that have been put into effect by the management controller in response to one or more previously received commands.

Example 28

An example apparatus may include circuitry at a switch for one or more compute nodes. The circuitry of the example apparatus may be arranged to receive an Ethernet frame from a port of the switch coupled to a management controller resident on a compute node from among the one or more compute nodes. The circuitry of the example apparatus may also be arranged to determine whether the Ethernet frame has an Ethernet header that indicates the Ethernet frame includes an NC-SI control packet. The circuitry of the example apparatus may also be arranged to respond to a command included in the NC-SI control packet based the determination by the filter component.

Example 29

The example apparatus of example 28, the port of the switch may be coupled to a dedicated Ethernet link to the management controller.

Example 30

The example apparatus of example 29, the dedicated Ethernet link may be arranged to route Ethernet frames through a SerDes interface.

Example 31

The circuitry of the example apparatus of example 29 may also be arranged to send a response to the command in another Ethernet frame via the dedicated Ethernet link. For example 41, the other Ethernet frame may have another Ethernet header that indicates an NC-SI control packet that includes the response.

Example 32

The example apparatus of example 31, the command may include a request for a MAC address for the management controller to receive or send Ethernet frames through a network I/O device maintained at the switch.

Example 33

The example apparatus of example 32 may also include a memory (e.g., non-volatile memory). For example 33, the circuitry of the example apparatus may be arranged to obtain the MAC address for the management controller from the memory in order to respond to the command for the MAC address.

Example 34

The example apparatus of example 33, the command may include an OEM command that includes vender-specific information to obtain the MAC address from among a plurality of MAC addresses maintained in the memory for use by the one or more compute nodes to separately receive or send Ethernet frames through one or more network I/O devices maintained at the switch.

Example 35

The example apparatus of example 28, the circuitry of the example apparatus may be arranged to determine that the Ethernet header indicates the Ethernet frame includes the NC-SI control packet based on an EtherType field in the Ethernet header that has a hexadecimal value of 0x88F8.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
  circuitry at a switch for one or more compute nodes;
  a receive component for execution by the circuitry to receive an Ethernet frame from a port of the switch coupled to a management controller resident on a compute node from among the one or more compute nodes;
  a filter component for execution by the circuitry to determine whether the Ethernet frame has an Ethernet header that indicates the Ethernet frame includes a network controller sideband interface (NC-SI) control packet; and
  a response component for execution by the circuitry to respond to a command included in the NC-SI control packet based on the determination by the filter component, the command including a request for a media access control (MAC) address for the management controller to receive or send Ethernet frames through a network input/output (I/O) device maintained at the switch.

2. The apparatus of claim 1, comprising the port of the switch coupled to a dedicated Ethernet link to the management controller.

3. The apparatus of claim 2, comprising the dedicated Ethernet link arranged to route Ethernet frames through a serializer/deserializer (SerDes) interface.

4. The apparatus of claim 2, comprising:
  a send component for execution by the circuitry to send a response to the command in another Ethernet frame via the dedicated Ethernet link, the other Ethernet frame having another Ethernet header that indicates an NC-SI control packet that includes the response.

5. The apparatus of claim 4, comprising:
  a memory, the response component capable of obtaining the MAC address for the management controller from the memory in order to respond to the command for the MAC address.

6. The apparatus of claim 5, the command comprising an original equipment manufacturer (OEM) command that includes vendor-specific information to obtain the MAC address from among a plurality of MAC addresses maintained in the memory for use by separate management controllers at the one or more compute nodes to separately receive or send Ethernet frames through one or more network I/O devices maintained at the switch.

7. The apparatus of claim 1, comprising the filter component to determine the Ethernet header indicates that the Ethernet frame includes the NC-SI control packet based on an EtherType field in the Ethernet header that has a hexadecimal value of 0x88F8.

8. A method comprising:
  receiving, at a switch for one or more compute nodes, an Ethernet frame from a port of the switch coupled to a management controller resident on a compute node from among the one or more compute nodes;
  determining whether the Ethernet frame has an Ethernet header that indicates the Ethernet frame includes a network controller sideband interface (NC-SI) control packet; and
  forwarding the Ethernet frame to a control processor for the switch that is capable of responding to a command included in the NC-SI control packet based on the determination, the command including a request for a media access control (MAC) address for the management controller to receive or send Ethernet frames through a network input/output (I/O) device maintained at the switch.

9. The method of claim 8, comprising the port of the switch coupled to a dedicated Ethernet link to the management controller.

10. The method of claim 9, comprising the dedicated Ethernet link arranged to route Ethernet frames through a serializer/deserializer (SerDes) interface.

11. The method of claim 9, comprising:
  sending a response to the command in another Ethernet frame via the dedicated Ethernet link, the other Ethernet frame having another Ethernet header that indicates an NC-SI control packet that includes the response.

12. The method of claim 11, comprising:
  obtaining the MAC address for the management controller from a memory maintained at the switch in order to respond to the command for the MAC address.

13. The method of claim 12, the command comprising an original equipment manufacturer (OEM) command that includes vendor-specific information to obtain the MAC address from among a plurality of MAC addresses maintained in the memory for use by separate management controllers at the one or more compute nodes to separately receive or send Ethernet frames through one or more network I/O devices maintained at the switch.

14. The method of claim 8, comprising the Ethernet header indicating that the Ethernet frame includes the NC-SI control packet based on an EtherType field in the Ethernet header that has a hexadecimal value of 0x88F8.

15. At least one non-transitory machine readable medium comprising a plurality of instructions that in response to being executed on a system at a switch for one or more compute nodes cause the system to:
  receive an Ethernet frame from a port of the switch coupled to a management controller resident on a compute node from among the one or more compute nodes;
  determine whether the Ethernet frame has an Ethernet header that indicates the Ethernet frame includes a network controller sideband interface (NC-SI) control packet; and
  forward the Ethernet frame to a control processor for the switch that is capable of responding to a command included in the NC-SI control packet based on the determination, the command including a request for a media access control (MAC) address for the management controller to receive or send Ethernet frames through a network input/output (I/O) device maintained at the switch.

16. The at least one machine readable medium of claim 15, comprising the port of the switch coupled to a dedicated Ethernet link to the management controller.

17. The at least one machine readable medium of claim 16, the dedicated Ethernet link arranged to route Ethernet frames through a serializer/deserializer (SerDes) interface.

18. The at least one machine readable medium of claim 16, comprising the instructions to cause the system to:
 send a response to the command in another Ethernet frame via the dedicated Ethernet link, the other Ethernet frame having another Ethernet header that indicates an NC-SI control packet that includes the response.

19. The at least one machine readable medium of claim 18, the command comprising an original equipment manufacturer (OEM) command that includes vendor-specific information to obtain the MAC address from among a plurality of MAC addresses maintained in a memory for use by separate management controllers at the one or more compute nodes to separately receive or send Ethernet frames through one or more network I/O devices maintained at the switch.

20. The at least one machine readable medium of claim 15, comprising the Ethernet header indicating the Ethernet frame includes the NC-SI control packet based on an EtherType field in the Ethernet header that has a hexadecimal value of 0x88F8.

21. The at least one machine readable medium of claim 15, comprising the command including a request to set a media access control (MAC) address to set-up one or more unicast or multicast MAC address filters at the switch in order to selectively forward inbound Ethernet frames to the management controller.

22. The at least one machine readable medium of claim 15, comprising the command including a request for a copy of currently stored parameter settings at the switch that have been put into effect by the management controller in response to one or more previously received commands.

* * * * *